(12) United States Patent
Szelag et al.

(10) Patent No.: US 10,151,854 B1
(45) Date of Patent: Dec. 11, 2018

(54) PROCESS FOR ASSEMBLY OF MULTIMODE HYDROPHONE CERAMIC STACK

(71) Applicants: Jeffrey A Szelag, Westport, MA (US); Michael R Zarnetske, Bristol, RI (US)

(72) Inventors: Jeffrey A Szelag, Westport, MA (US); Michael R Zarnetske, Bristol, RI (US)

( * ) Notice: Subject to any disclaimer, the term of this patent is extended or adjusted under 35 U.S.C. 154(b) by 197 days.

(21) Appl. No.: 15/270,192

(22) Filed: Sep. 20, 2016

(51) Int. Cl.
*G01V 13/00* (2006.01)
*G01V 1/20* (2006.01)
*H04R 1/44* (2006.01)

(52) U.S. Cl.
CPC .............. *G01V 13/00* (2013.01); *G01V 1/201* (2013.01); *H04R 1/44* (2013.01)

(58) Field of Classification Search
CPC ... B06B 1/0622; G01S 15/8902; G01S 7/521; G01S 7/526; G01S 7/60; G01S 15/06; G01S 15/89; G10K 11/004
See application file for complete search history.

(56) References Cited

U.S. PATENT DOCUMENTS

| | | | | |
|---|---|---|---|---|
| 3,290,646 A | * | 12/1966 | Ehrlich | G01S 1/72 367/141 |
| 3,435,408 A | * | 3/1969 | Moore | G01S 7/52004 367/13 |
| 3,846,744 A | * | 11/1974 | Renna, Jr. | B06B 1/0655 367/159 |
| 4,499,566 A | * | 2/1985 | Abbott | B06B 1/0611 310/337 |
| 5,018,116 A | * | 5/1991 | Congdon | B06B 1/0611 310/334 |
| 5,729,077 A | * | 3/1998 | Newnham | H02N 2/043 310/328 |
| 7,372,776 B2 | * | 5/2008 | Butler | B06B 1/0618 367/138 |
| 9,360,495 B1 | * | 6/2016 | Goodemote | G01P 15/09 |
| 2003/0058741 A1 | * | 3/2003 | Franklin | H04R 17/00 367/174 |

* cited by examiner

*Primary Examiner* — Minh Trinh
(74) *Attorney, Agent, or Firm* — James M. Kasischke; Michael P. Stanley

(57) ABSTRACT

A method of assembling a hydrophone is provided in which the method stacks ceramic rings, delrin washers, and LC-800 washers such that a top edge of a composite stack extends beyond a top of a hydrophone flange. By measuring the voltage on each ceramic ring while an end cap and a socket head cap screw are installed; the axial compression of each ceramic ring is quantified; thereby, providing an opportunity to equalize the axial compression of each ceramic ring to yield an accurately performing hydrophone.

5 Claims, 27 Drawing Sheets

US 10,151,854 B1

PROCESS FOR ASSEMBLY OF MULTIMODE HYDROPHONE CERAMIC STACK

STATEMENT OF GOVERNMENT INTEREST

The invention described herein may be manufactured and used by or for the Government of the United States of America for governmental purposes without the payment of any royalties thereon or therefor.

CROSS REFERENCE TO OTHER PATENT APPLICATIONS

None.

BACKGROUND OF THE INVENTION

(1) Field of the Invention

The present invention relates to a method of assembly for a multimode acoustic hydrophone.

(2) Description of the Prior Art

An acoustic hydrophone can transfer underwater pressure waves to electrical energy. As a result, an output charge can be monitored from piezoelectric material with the operation similar to using an underwater microphone. Typically, hydrophones are used as omni-directional sensors or are used as directional sensors in an array format.

The design of a multimode hydrophone was originally disclosed in U.S. Pat. No. 3,290,646. In the reference, a multimode hydrophone includes a piezoelectric stack and associated electronics that can provide directional receiving responses. For other hydrophones, it has been shown that if an axial stress is non-uniform on any of the ceramic rings; a bearing to a source of an incoming pressure wave indicated by a hydrophone varies erratically. The hydrophones therefore become useless devices.

FIG. 1 thru FIG. 12 chart a performance difference of a hydrophone that does not have uniform axial stress/voltage on each ring, when the hydrophone is assembled and FIG. 13 thru FIG. 24 chart a performance difference of a hydrophone that does have uniform axial stress/voltage on each ring when the hydrophone is assembled. The plots depict bearing error relative to a known source location as a function of frequency. Each curve represents a different azimuth angle. In total, there are azimuthal measurements made every thirty degrees around a 360 degree circle.

To have an accurate hydrophone, it is desirable that each curve be as close to zero as possible in order to indicate that a bearing to a source is accurate. As shown in FIG. 13 thru FIG. 24, the hydrophone is much more accurate than the hydrophone shown in FIG. 1 thru FIG. 12 since the curves in FIG. 13 thru FIG. 24 are at approximately zero plus or minus 10 degrees. The curves in FIG. 1 thru FIG. 12 have large excursions (greater than thirty degrees and less than thirty degrees) at numerous frequencies. The difference between the hydrophones in FIG. 1 thru FIG. 12 and the hydrophones in FIG. 13 thru FIG. 24 are an applied axial compression of each of the five tangentially-poled ceramic rings.

A hydrophone 10 of the prior art is shown in FIG. 25. The hydrophone 10 includes tangentially-poled ceramic (lead-zirconate titanate) rings 12, a Delrin washers 14, a LC-800 washers 16, 26 AWG insulated wire 18, a stainless steel flange 20, an end cap 22, 30 AWG uninsulated bus wire 24, solder joints 26, ¼-28 socket head screw 28, and a phenolic feed through assembly 30.

The direction of assembly is axially from right to left when the hydrophone is assembled. The ceramic rings 12 are slid on a shaft (flange) and capped with the socket head screw 28 which imparts an axial compression on the ceramic ring stack. If compression is asymmetric on the five rings; the performance is indicative as these plots are shown in FIG. 1 thru FIG. 12. If the compression is uniform on all the rings; the performance improves to be indicative of those plots shown in FIG. 13 thru FIG. 24.

Numerous references detail the assembly of ceramic rings. In Butler (U.S. Pat. No. 4,326,275) ceramic discs are mounted to brass flexural discs using a conductive epoxy on adjoining surfaces. The ceramic discs have approximately the same thickness as the brass flexural discs but are slightly smaller in diameter so that the discs fit within hollow cavities by the closing of rings by the flexural discs.

Congdon (U.S. Pat. No. 5,018,116) discloses a hydrophone with a ceramic stack, which includes an outer rubber boot covering the ceramic stack. Between the stack and the inner surface of the boot is a layer of polyurethane elastomer which bonds the boot to the stack and serves as an acoustical transfer agent to transfer sound pressure waves to the stack.

Purcell et al. (U.S. Pat. No. 6,584,039) discloses an axial drive resonant pipe projector that contains a ceramic stack piezoelectric drive element, rings, and a watertight seal to seal the stack from seawater. A Neoprene boot isolates active components from seawater and is bonded to the stack by epoxy. Restraining clamps are clamped on a central boss of the end plates at either end of the stack with a stack of ceramic rings that may be varied or a single piezoelectric cylinder.

Birchak et al. (U.S. Pat. No. 6,594,199) discloses a hydrophone with a mounting portion having yoke legs which extend parallel to a longitudinal axis of a stack of piezoelectric crystals, instead of extending perpendicular to the axis as in the hydrophone. The hydrophone also includes an opening formed between the mounting portion and the membrane enclosing the stack, for even or symmetrical application of fluid pressure to the crystals.

Butler et al. (U.S. Pat. No. 6,950,373) discloses a piezoelectric ceramic stack of four elements driving a transmission line for asymmetric drive, consecutive mode excitation. The electrically inactive section to the right of the piezoelectric section may be constructed from an acoustically satisfactory material, and connected. A material that matches the impedance between the piezoelectric ceramic material and the medium, such as water, would be one example.

Butler et al. (U.S. Pat. No. 7,372,776) discloses a schematic of a five ring transducer array. The five transducer array rings may be 1.5 inches high; each with a total array height if approximately nine inches; including the isolation gaps and end caps. The diameter of the array may be six inches and the eight piezoelectric stacks of each ring are sandwiched between eight aluminum pistons and common centrally disposed between steel mass.

Hama (U.S. Pat. No. 7,418,102) discloses an echo sounder with a front mass, a layered product of piezoelectric ceramics. The piezoelectric ceramics have a ring shape and are layered in such a manner to define an inner space. The layered product of the ceramics is sandwiched between the front mass and the rear mass. A compressive force is exerted on the layered product of ceramics.

Porzio (U.S. Pat. No. 7,495,370) discloses a transducer configuration wherein the head mass includes a piezoceramic receiver such as a monolithic ceramic disk that acts as both a hydrophone and the head mass for a second ceramic body, which takes the form of a composite tape-cast ceramic stack.

Porzio (U.S. Pat. No. 7,535,801) discloses a driver in the form of a stack of piezoelectric rings. The driver may be magnetostrictive material that can provide a selected vibratory frequency through the excitation provided by oscillatory magnetic fields. The driver may be made of a lead-zirconate-titanate ceramic, terfernol-D or other electrostrictive, magnetostrictive, piezoceramic or piezomagnetic solid state material. The transducer may be operated as a projector of acoustic signals of a desired frequency but may also be operated as an acoustic receiver or hydrophone.

Goodemote (U.S. Pat. No. 7,583,010) discloses a hybrid transducer that includes a headmass, tailmass, and an active structure disposed intermediate the headmass and the tailmass. The active structure is a low defect, high dielectric, modified pZT-5H type ceramic material.

Butler et al. (U.S. Pat. No. 8,599,648) discloses a continuous piezoelectric ring in contact with a shell through spaced apart supports. The ring is shown with eight margins or gaps on the electrode surface allowing a piezoelectric mode of excitation of the monopole, dipole and quadrupole modes and also allowing incremental steering every 45 degrees. The use of more and wider margins allows excitation of the piezoelectric ring in the higher coupled piezoelectric mode of operation.

Alternatives processes attempted in the past have provided inconsistent results of hydrophone performance. Previously, ceramic rings and interstitial layers have been stacked onto the shaft and a measurement of the overshoot of the stack relative to the top surface was used for setting the compression. This method, although physically repeatable, does not provide repeatable results in the performance of the hydrophones.

SUMMARY OF THE INVENTION

It is therefore a primary object and general purpose of the present invention to provide a method of assembly of a hydrophone in which an axial compression of the ceramic rings of the hydrophone can be equalized.

It is therefore a further object of the present invention to provide a method of assembly of a hydrophone in which the hydrophone can be used across a wide range of frequencies.

It is therefore a still further object of the present invention to provide a method of assembly for a comparatively smaller transducer that is easier to handle, install and less costly to manufacture than existing transducers.

In order to attain the objects of the invention, a method of assembly of a hydrophone is provided in which the method utilizes an array of tangentially poled ceramic rings. The hydrophone is assembled by stacking the ceramic rings, Delrin washers and LC-800 washers such that a top edge of a composite stack slightly extends beyond a top of a hydrophone flange.

The method is functional in that the results of hydrophone performance are varied because this method does not include a determination of axial compression of each of the ceramic rings. Instead, the stack is measured in total where compression among each ring would not be measurable. By measuring the voltage on each ceramic ring of the composite stack while an end cap and a cap screw are installed; the axial compression of each ceramic ring is quantified; thereby, providing an opportunity to equalize the axial compression of each ceramic ring to yield an accurately performing hydrophone.

BRIEF DESCRIPTION OF THE DRAWINGS

Reference is made to the accompanying drawings in which is shown an illustrative embodiment of the invention, from which its novel features and advantages will be apparent, wherein corresponding reference characters indicate corresponding parts throughout the several views of the drawings and wherein.

DETAILED DESCRIPTION OF THE INVENTION

Figure 26:
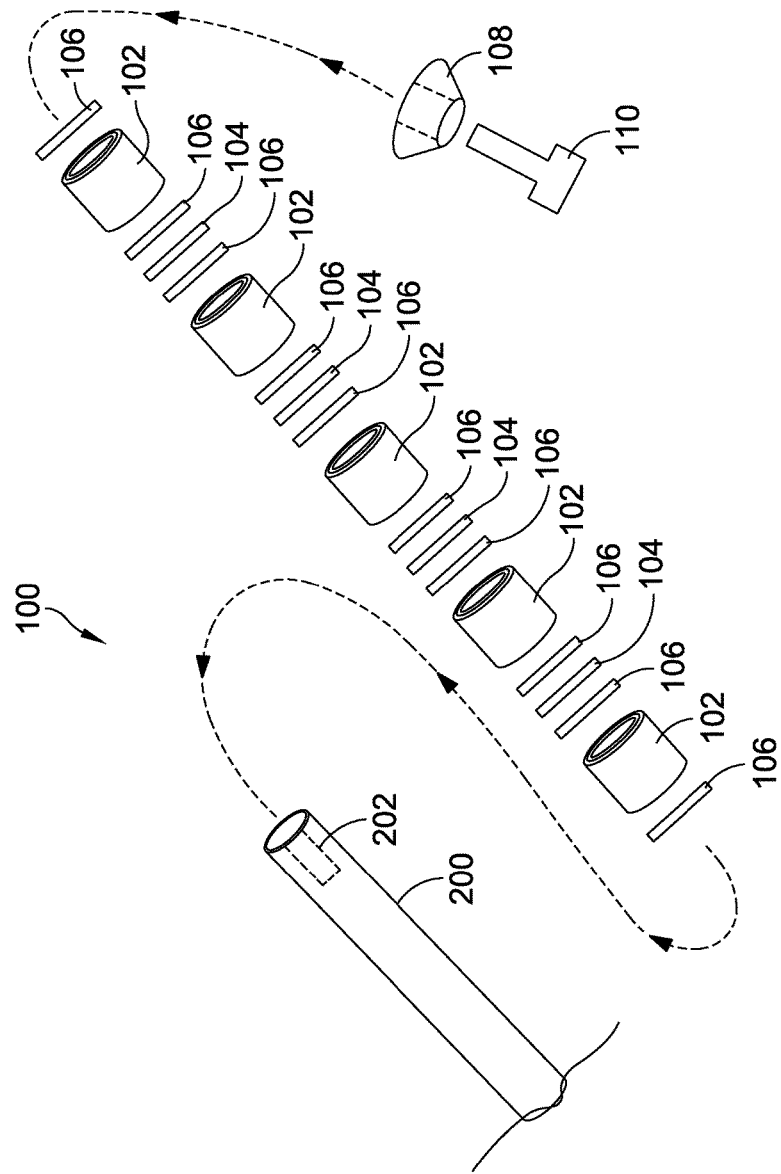
FIG. 26 depicts the individual components of the hydrophone of the present invention prior to assembly.
Figure 27:
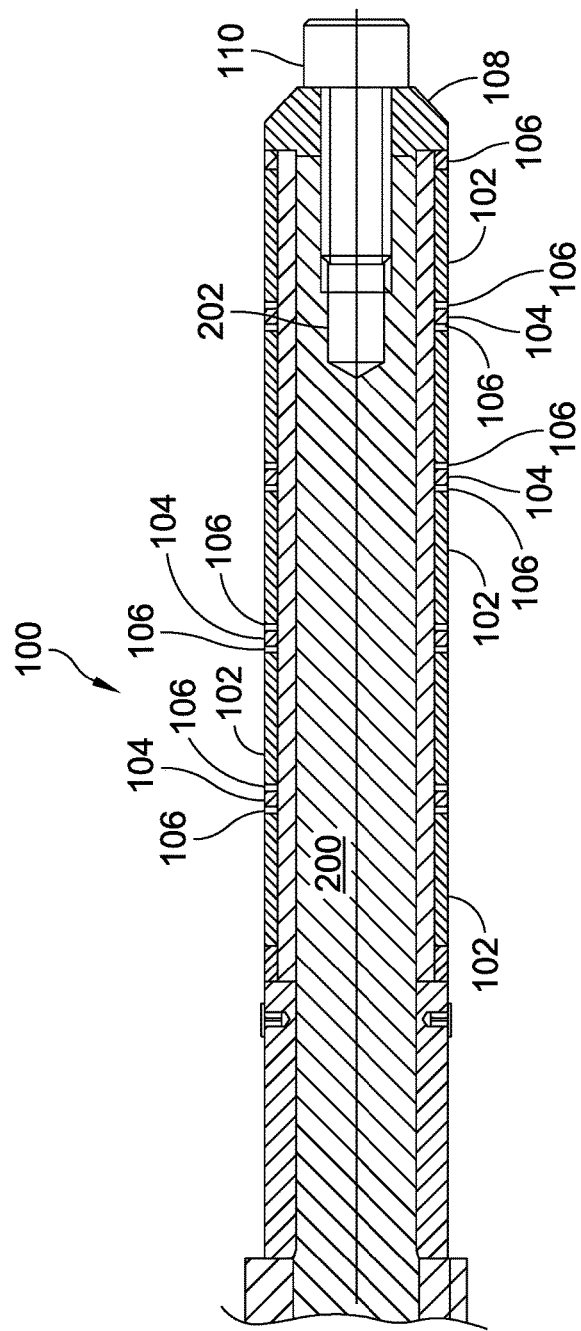
FIG. 27 depicts a cut-away view of the hydrophone of the present invention.

Referring to FIG. 26 and FIG. 27, a hydrophone 100 of the present invention is provided. Prior to assembly, the components of the hydrophone 100 are sized for precision. The hydrophone 100 is assembled by stacking ceramic rings 102, washers 104, and LC-800 washers 106 such that a top edge of a composite stack with an end cap 108 and a cap screw 110 extends beyond a top of a hydrophone flange 200 by 0.030 to 0.060 inches.

Each of the ceramic rings 102 preferably has a length of 0.475 inches and are hollowed with a thickness of 0.125 inches. Each of the ceramic rings 102 is sized to be slidable (by thousandths of an inch) on the flange 200.

The tangentially poled ceramic rings 102 are poled where consecutive sections (arcs) of the ring have an opposite polarity; thereby, dividing the ring into sections with two sections defining a quadrant. Being tangentially poled is a method of separating the ceramic cylinder into consecutive sections that have the opposite polarity; thus allowing the formation of quadrants which are required to operate as multimode hydrophones. When the quadrants are added, a widespread directionality is achieved in the results can be used to determine a bearing of incoming pressure waves.

The washers 104 are made from Delrin. Delrin is a nylon-like material that can be easily machined yet is rigid enough to provide the interstitial layers with a stiffness required to transfer an axial stress uniformly through the ceramic rings.

The LC-800 washers 106 provide adequate compliancy for mounting between ceramic cylinders or rings in that the LC-800 material maintains constant mechanical properties over a wide range of temperatures and pressures. LC-800 is also an acoustic decoupling material which isolates each of the rings so that the rings can perform independently.

The hydrophone flange 200 is preferably a solid stainless steel rod connected to electronics such as a data processor. The flange 200 preferably has a 3 inch length and 0.55 inch diameter. The flange also includes a tapped indent 202 that allows insertion of the cap screw 110.

The method is inventive in that the individual ceramic rings 102 are tested after assembly in order to confirm uniform axial stress. Voltage measurements are made by probes connectable to electrodes on the ceramic rings 102. Each of the ceramic rings 102, when the hydrophone 100 is energized, should measure to approximately one volt with a matching tolerance of approximately one tenth of a volt per ring when matched with other ceramic rings. If the matching tolerance is not met; the hydrophone 100 is disassembled to but not including the ceramic ring 102 which had the correct tolerance of one tenth of a volt to an adjacent ceramic ring. The other ceramic rings 102 are reassembled onto with the end cap 108 tightened with a minimal first torque.

If the tolerance between the ceramic rings 102 still does not have the correct matching tolerance; the hydrophone 100 is dissembled in the previously described manner of disassembly and retested until all of the ceramic rings have the correct matching tolerance. Once the matching tolerance is correct for all of the ceramic rings 102; then the end cap 108 is tightened to specifications at a second torque such that there is a uniform compression between the ceramic rings.

Electrical connection of the 26 AWG insulated wire 18 and the 30 AWG uninsulated bus wire 24 to the components of the hydrophone 100 for electrical operation of the hydrophone is known to those skilled in the art. Series voltage of the hydrophone 100 is not a consideration; however, parallel voltage with a correct matching tolerance is an important consideration for the hydrophone 100. Testing of the hydrophone 100 occurs after electrical connection of the bus wires. Disassembly for testing and retesting includes disconnecting the 26 AWG insulated wire 18 and the 30 AWG uninsulated bus wire 24.

After a voltage measurement is made, the cap screw 110 is tightened to compress the assembly of the ceramic rings 102 and other components. Tightening is to bottom out the cap screw 110 in the indent 202 of the flange 200. A normal "hand-tight" torque is used to tighten at the first torque and to loosen or "back-out" the cap screw 110 out of the flange 200 until there is a uniform voltage between all of the ceramic rings 102. Once the matching tolerance is correct for all of the ceramic rings 102; then the end cap 108 is tightened at a second torque such that there is a uniform compression between the ceramic rings and that a top edge of a composite stack with an end cap 108 and a cap screw 110 extends beyond a top of a hydrophone flange 200 by 0.030 to 0.060 inches.

The method is functional in that the results of hydrophone performance are varied because this method does not include a determination of axial compression of each of the ceramic rings 102. Instead, the composite stack is measured in total where compression among each ring would not be measurable. By measuring a voltage on each ceramic ring 102 of the composite stack while an end cap 110 and a ¼-28 socket head cap screw are installed; the axial compression of each ceramic ring is quantified; thereby, providing an opportunity to equalize the axial compression of each ceramic ring to yield an accurately performing hydrophone.

The magnitude of the voltage is important to a lesser degree than the deviation between the voltages measured on each ring. A deviation, or range, of voltage of plus/minus 0.1 VDC between all five rings, will produce an accurate hydrophone, such as the results depicted in FIGS. 13-24.

Figure 1:
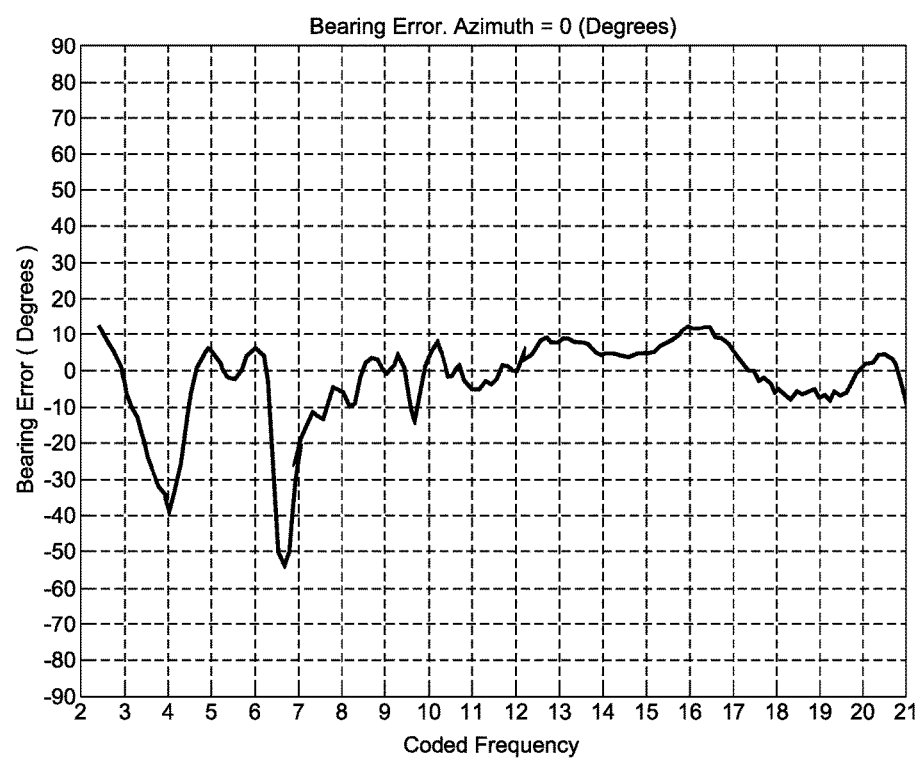
FIG. 1 depicts a performance difference between a hydrophone that does not have uniform axial stress/voltage on each ring when assembled with the parameters of bearing error and coded frequency with an azimuth of zero degrees.
Figure 2:
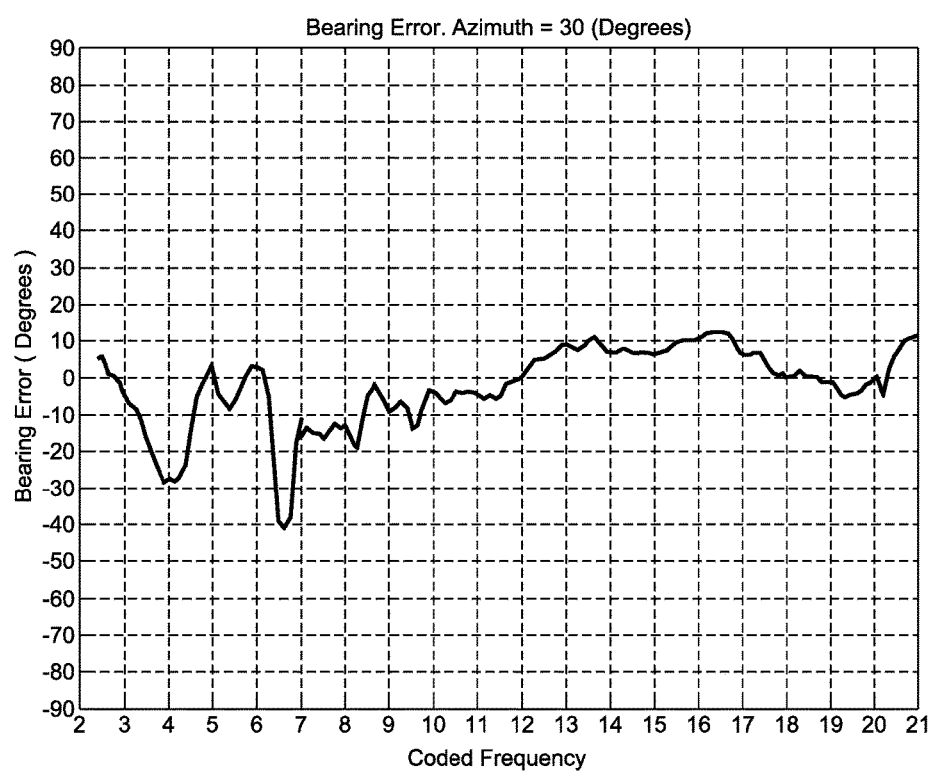
FIG. 2 depicts a performance difference between a hydrophone that does not have uniform axial stress/voltage on each ring when assembled with the parameters of bearing error and coded frequency with an azimuth of thirty degrees.
Figure 3:
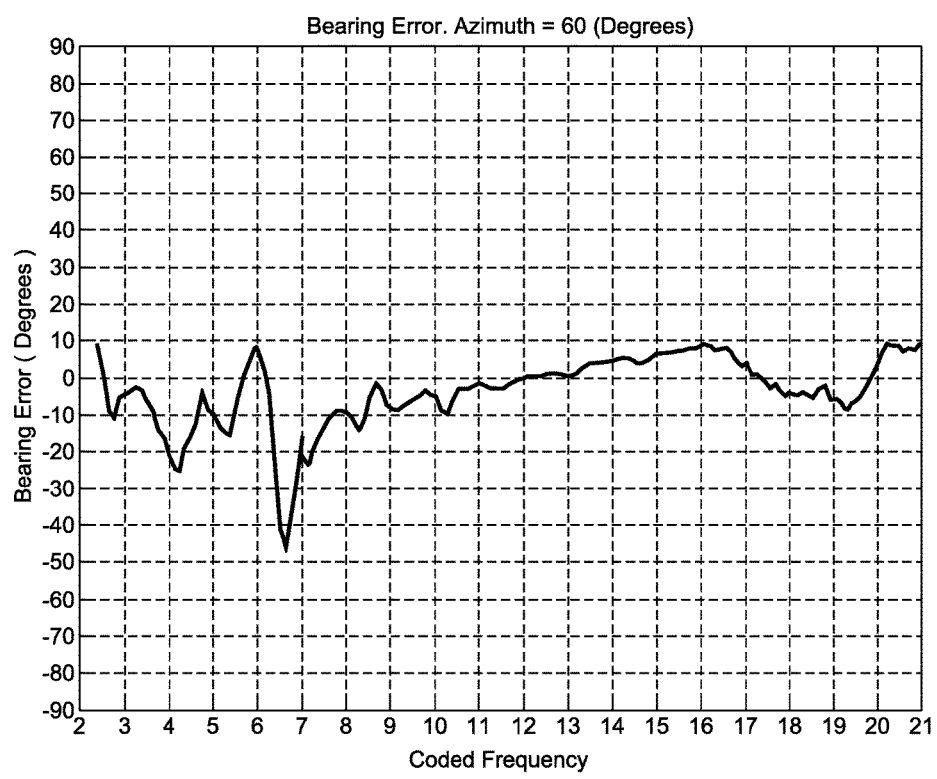
FIG. 3 depicts a performance difference between a hydrophone that does not have uniform axial stress/voltage on each ring when assembled with the parameters of bearing error and coded frequency with an azimuth of sixty degrees.
Figure 4:
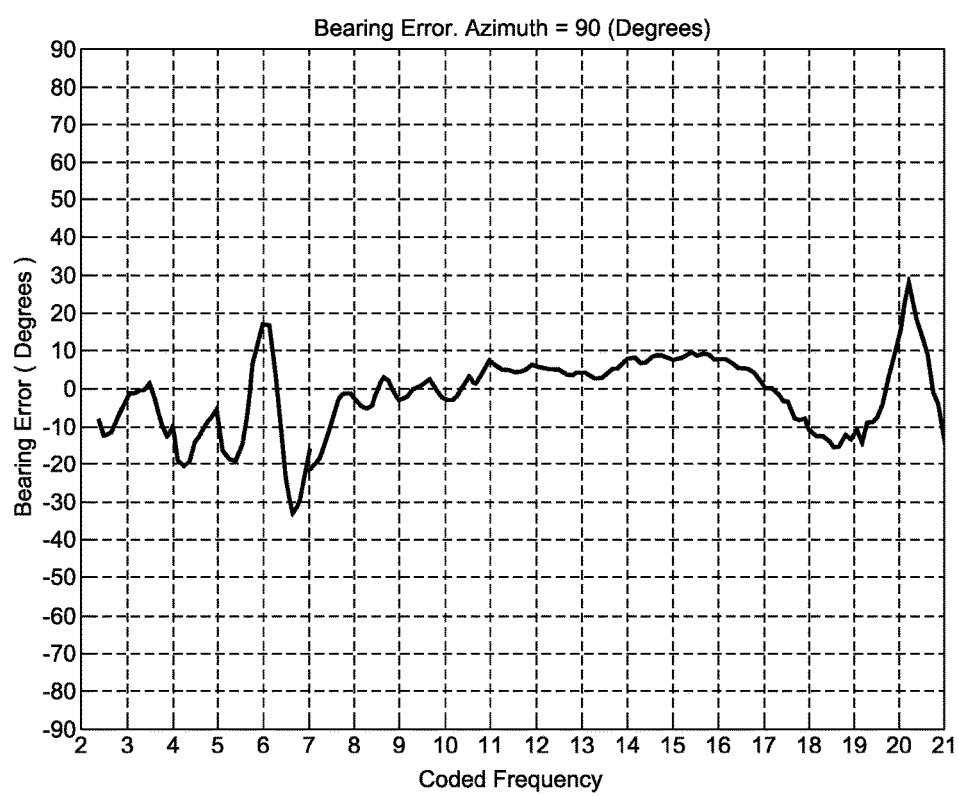
FIG. 4 depicts a performance difference between a hydrophone that does not have uniform axial stress/voltage on each ring when assembled with the parameters of bearing error and coded frequency with an azimuth of ninety degrees.
Figure 5:
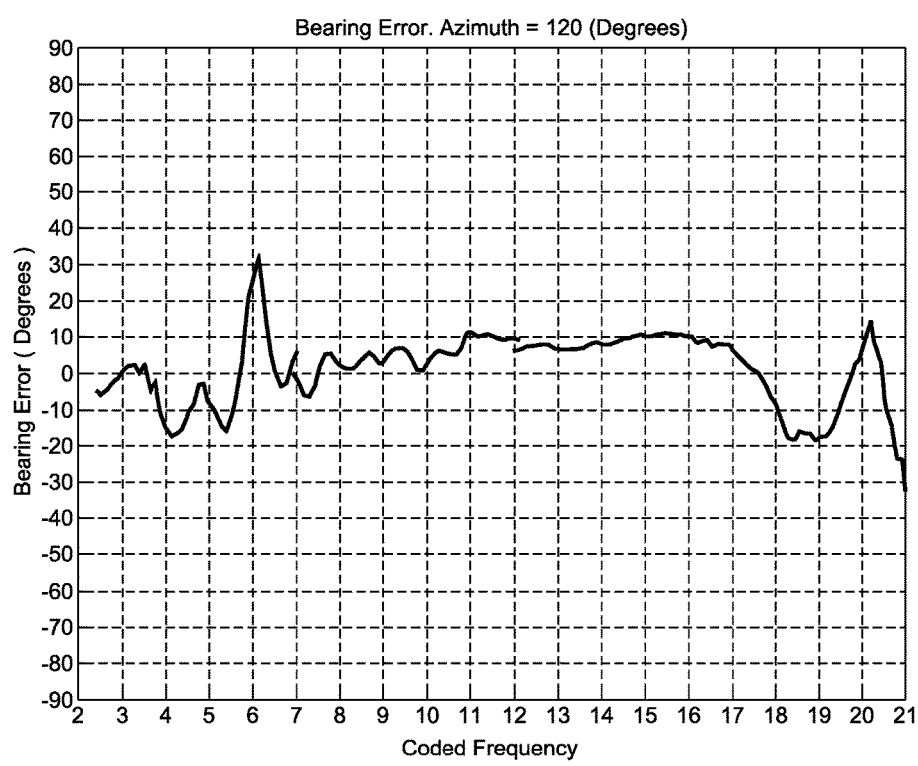
FIG. 5 depicts a performance difference between a hydrophone that does not have uniform axial stress/voltage on each ring when assembled with the parameters of bearing error and coded frequency with an azimuth of one hundred and twenty degrees.
Figure 6:
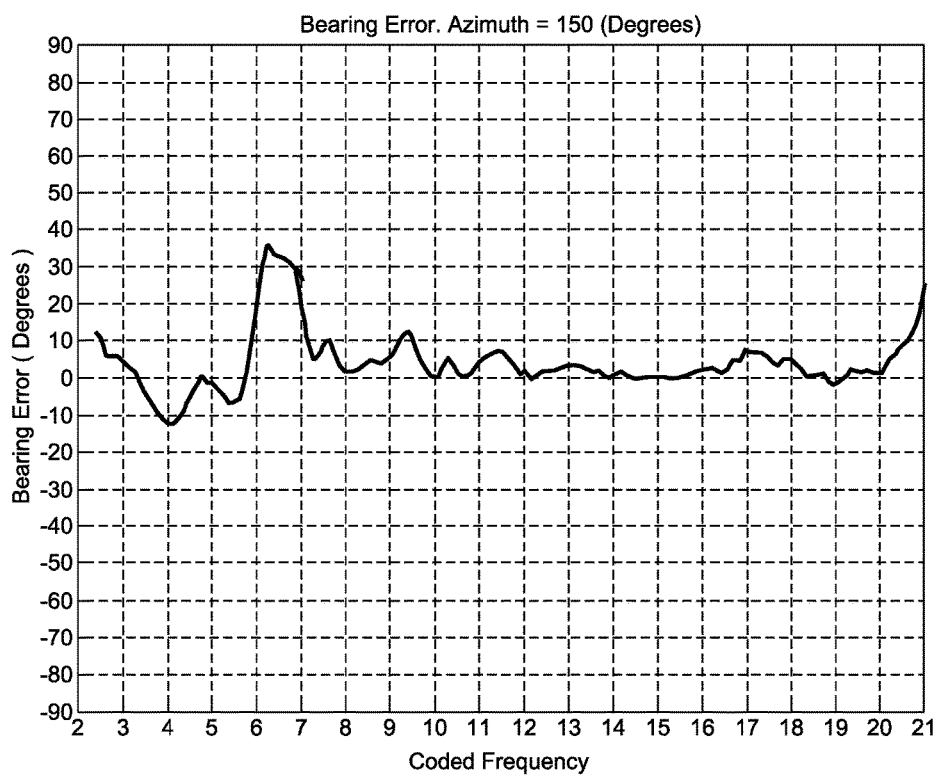
FIG. 6 depicts a performance difference between a hydrophone that does not have uniform axial stress/voltage on each ring when assembled with the parameters of bearing error and coded frequency with an azimuth of one hundred and fifty degrees.
Figure 7:
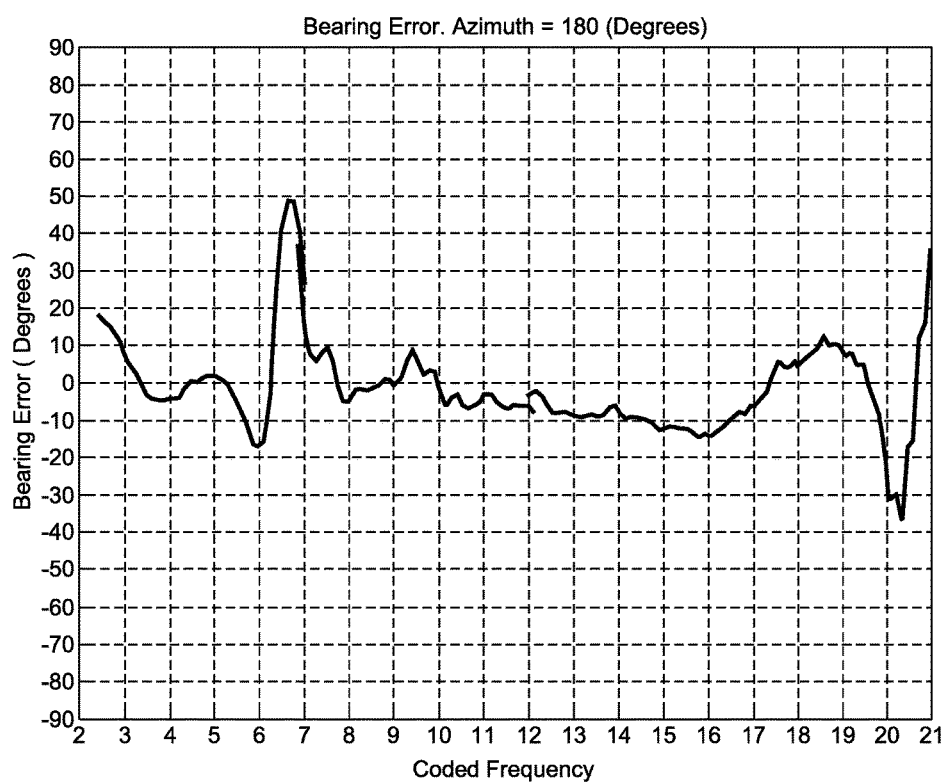
FIG. 7 depicts a performance difference between a hydrophone that does not have uniform axial stress/voltage on each ring when assembled with the parameters of bearing error and coded frequency with an azimuth of one hundred and eighty degrees.
Figure 8:
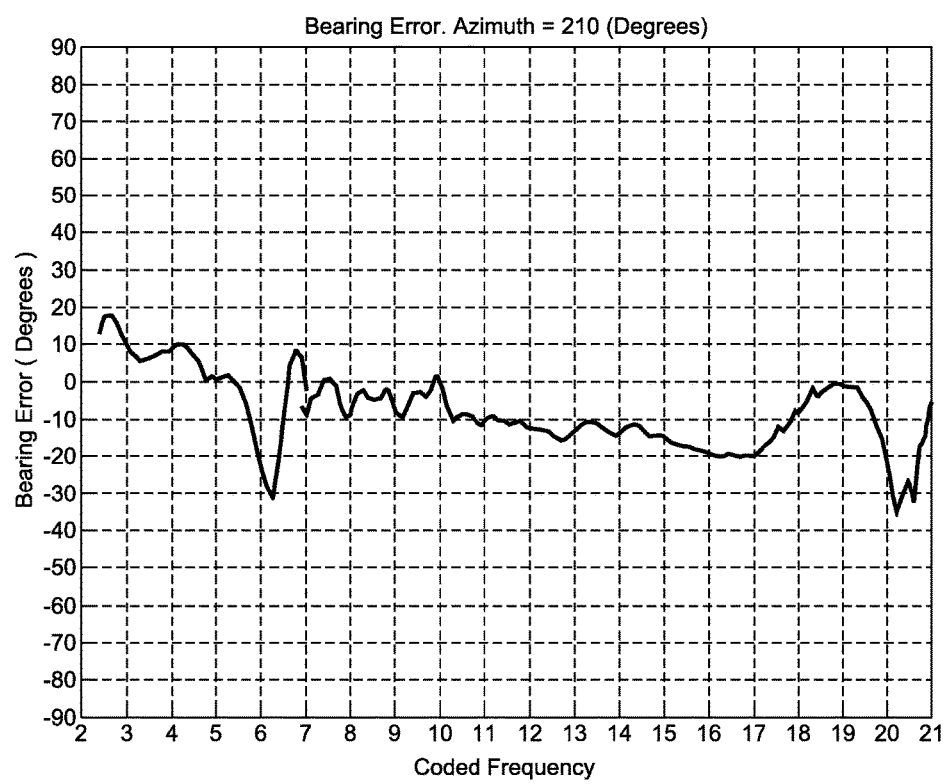
FIG. 8 depicts a performance difference between a hydrophone that does not have uniform axial stress/voltage on each ring when assembled with the parameters of bearing error and coded frequency with an azimuth of two hundred and ten degrees.
Figure 9:
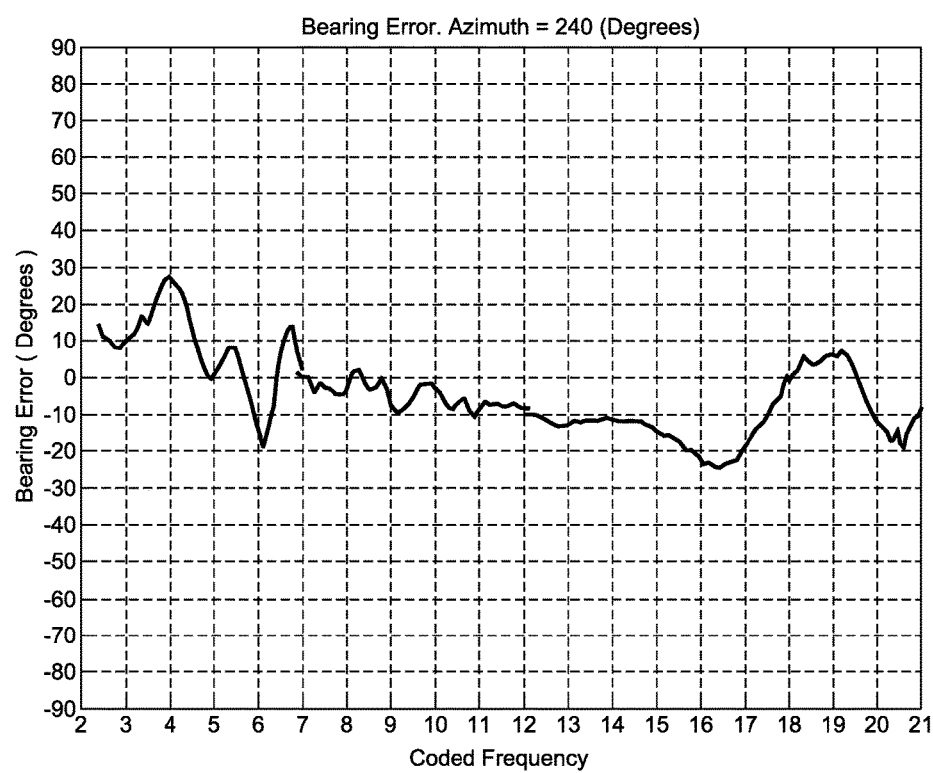
FIG. 9 depicts a performance difference between a hydrophone that does not have uniform axial stress/voltage on each ring when assembled with the parameters of bearing error and coded frequency with an azimuth of two hundred and forty degrees.
Figure 10:
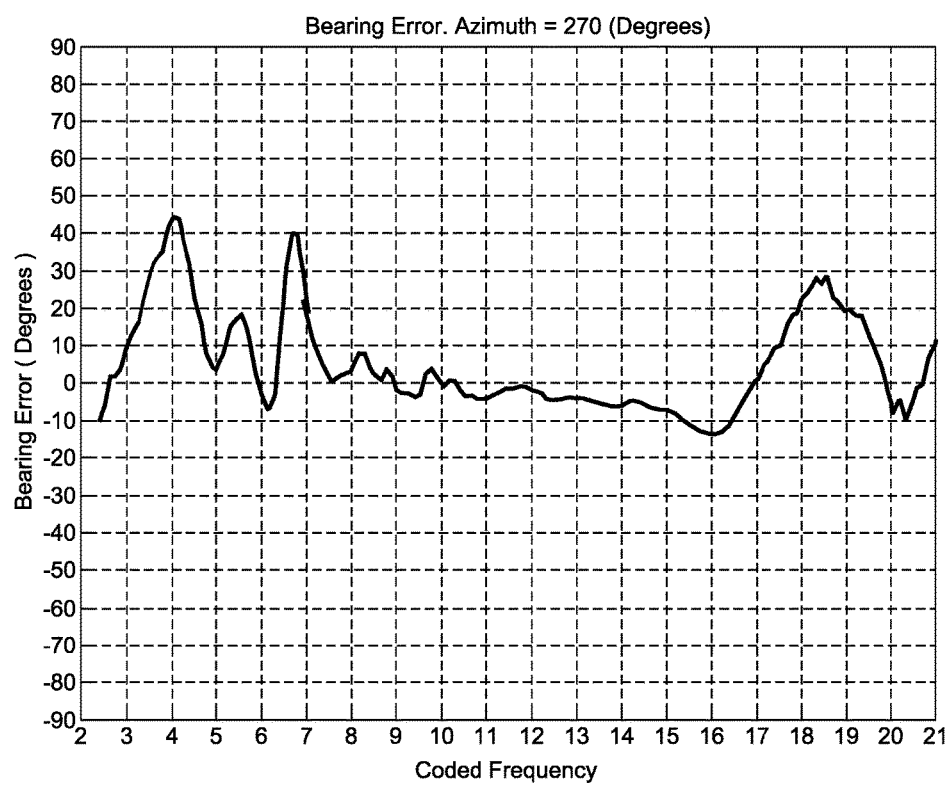
FIG. 10 depicts a performance difference between a hydrophone that does not have uniform axial stress/voltage on each ring when assembled with the parameters of bearing error and coded frequency with an azimuth of two hundred and seventy degrees.
Figure 11:
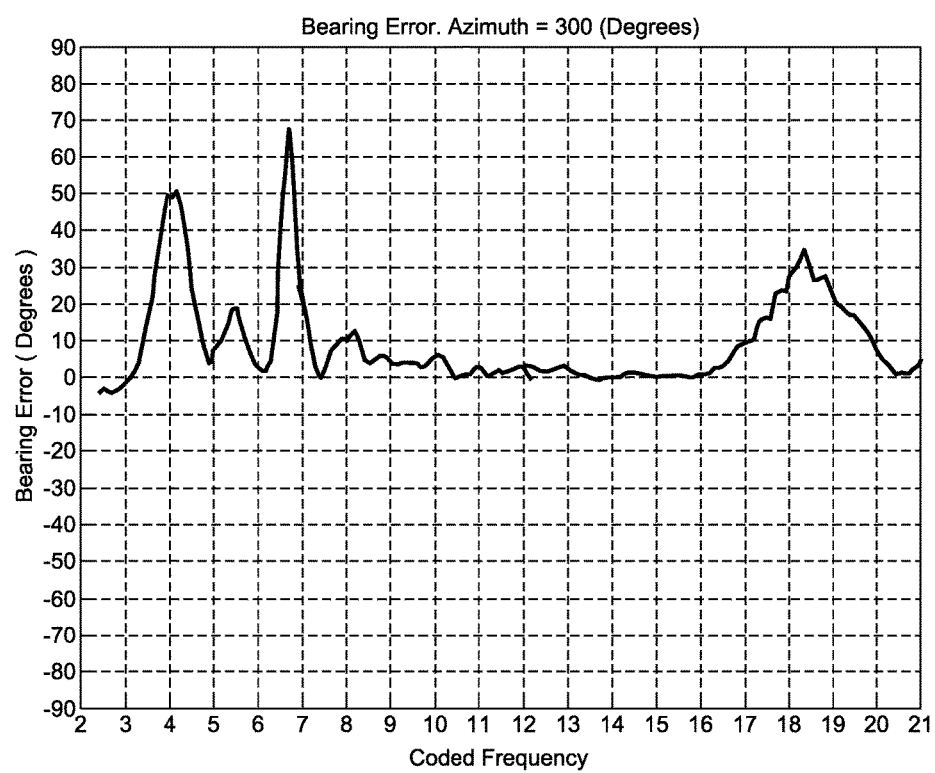
FIG. 11 depicts a performance difference between a hydrophone that does not have uniform axial stress/voltage on each ring when assembled with the parameters of bearing error and coded frequency with an azimuth of three hundred degrees.
Figure 12:
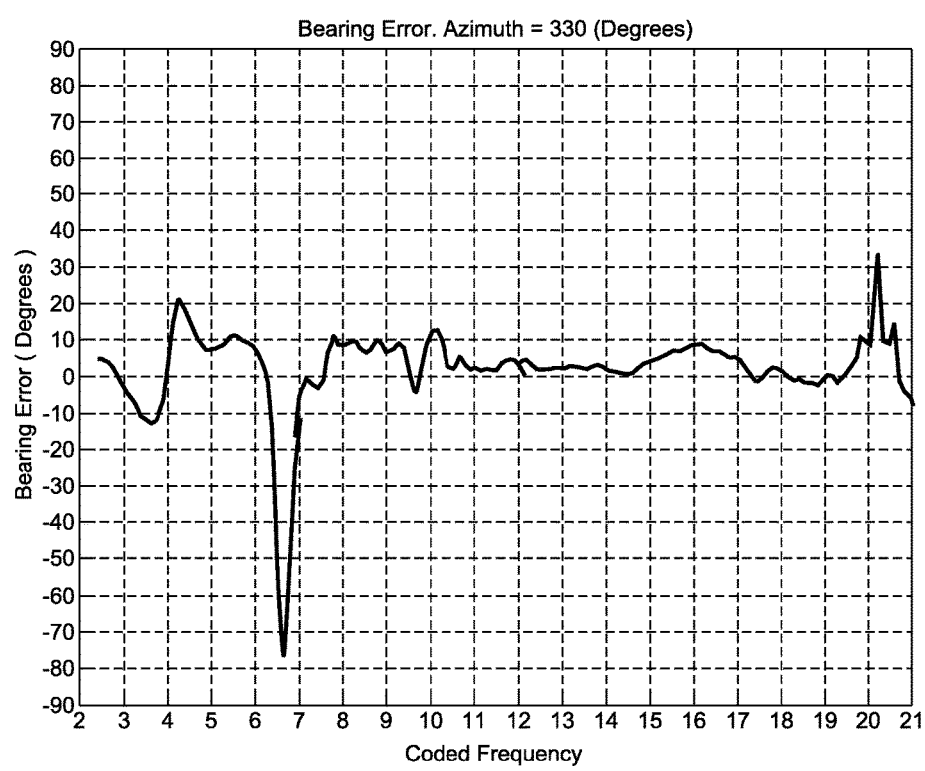
FIG. 12 depicts a performance difference between a hydrophone that does not have uniform axial stress/voltage on each ring when assembled with the parameters of bearing error and coded frequency with an azimuth of three hundred and thirty degrees.
Figure 13:
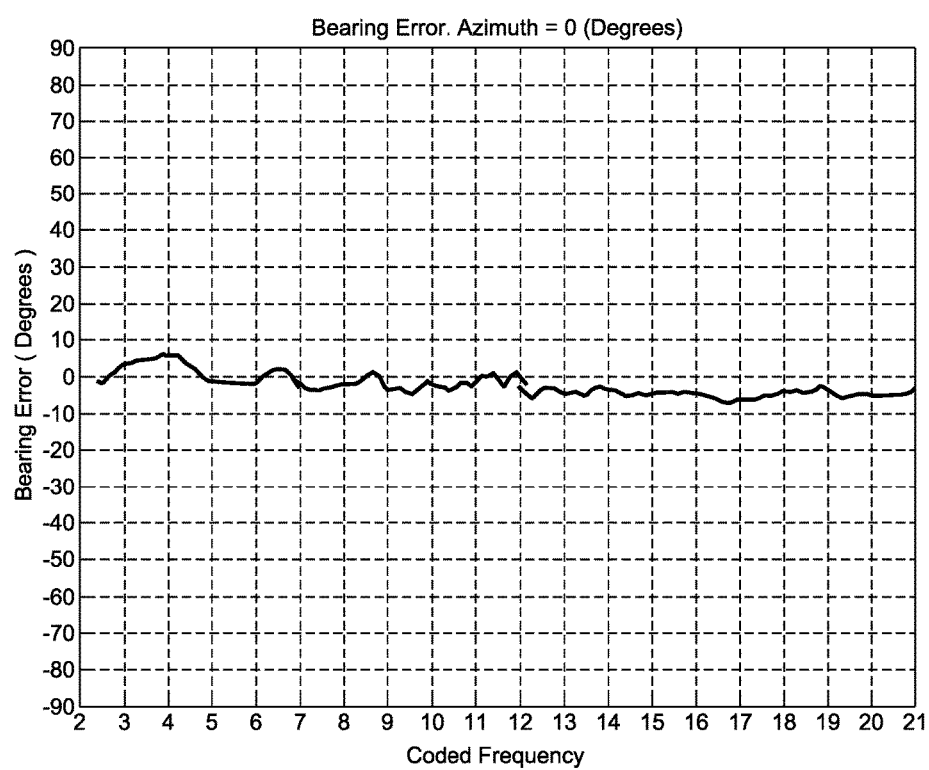
FIG. 13 depicts a performance difference between a hydrophone that does have uniform axial stress/voltage on each ring when assembled with the parameters of bearing error and coded frequency with an azimuth of zero degrees.
Figure 14:
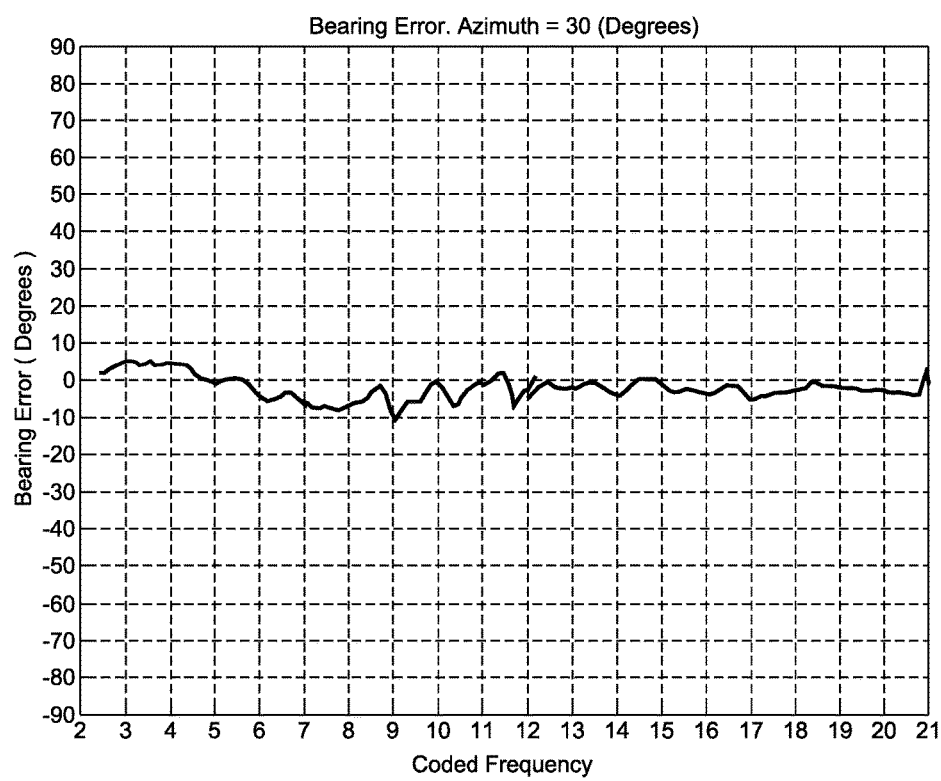
FIG. 14 depicts a performance difference between a hydrophone that does have uniform axial stress/voltage on each ring when assembled with the parameters of bearing error and coded frequency with an azimuth of thirty degrees.
Figure 15:
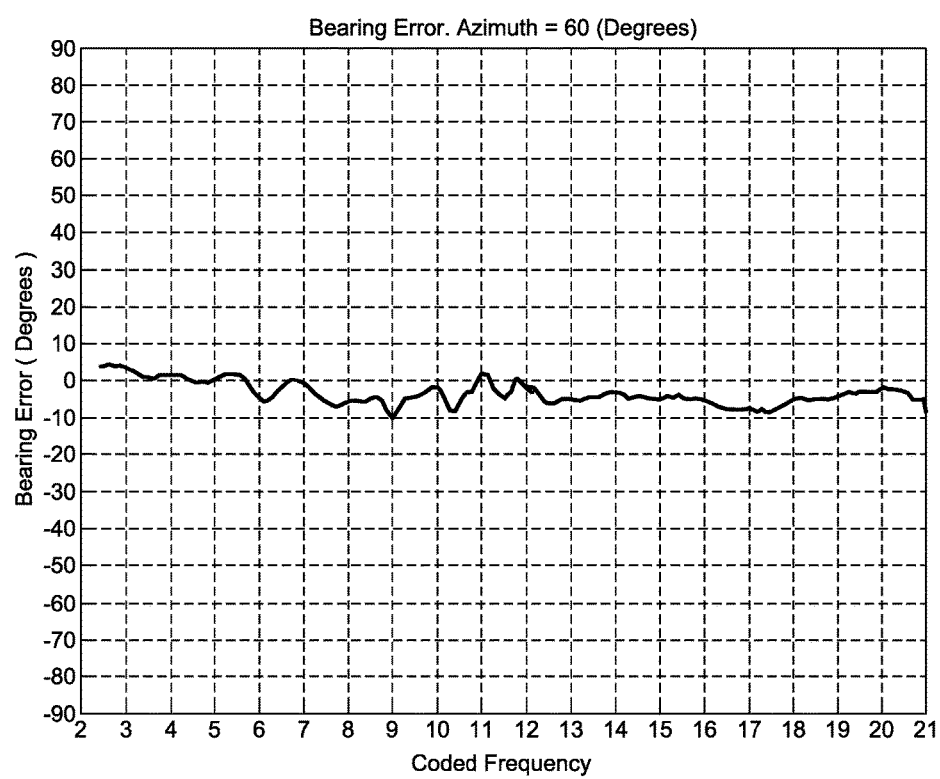
FIG. 15 depicts a performance difference between a hydrophone that does have uniform axial stress/voltage on each ring when assembled with the parameters of bearing error and coded frequency with an azimuth of sixty degrees.
Figure 16:
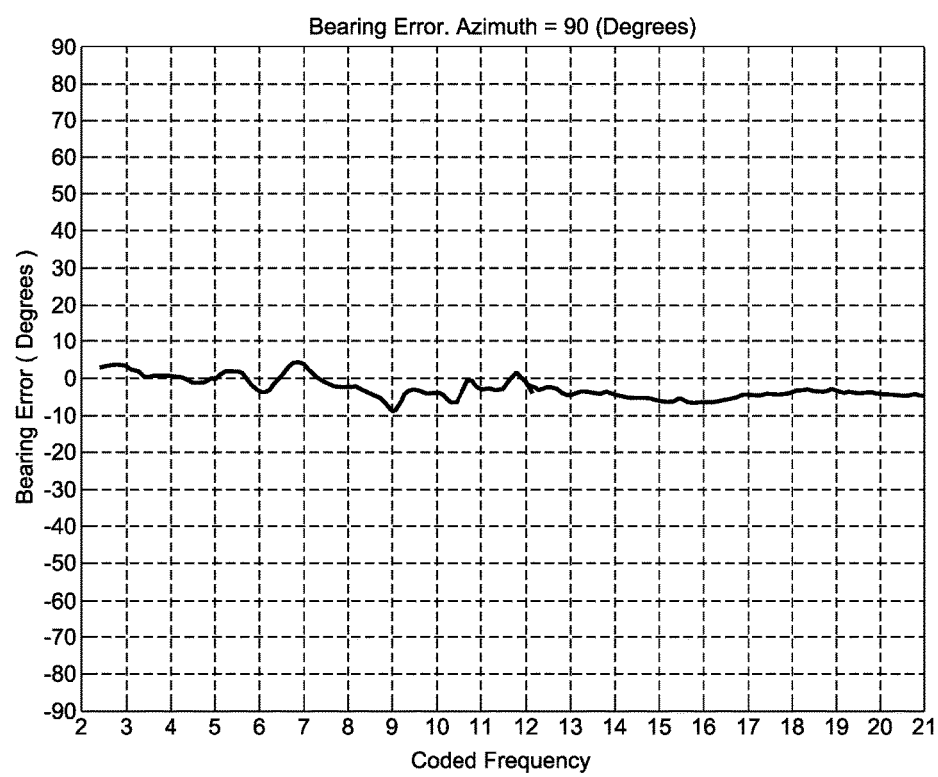
FIG. 16 depicts a performance difference between a hydrophone that does have uniform axial stress/voltage on each ring when assembled with the parameters of bearing error and coded frequency with an azimuth of ninety degrees.
Figure 17:
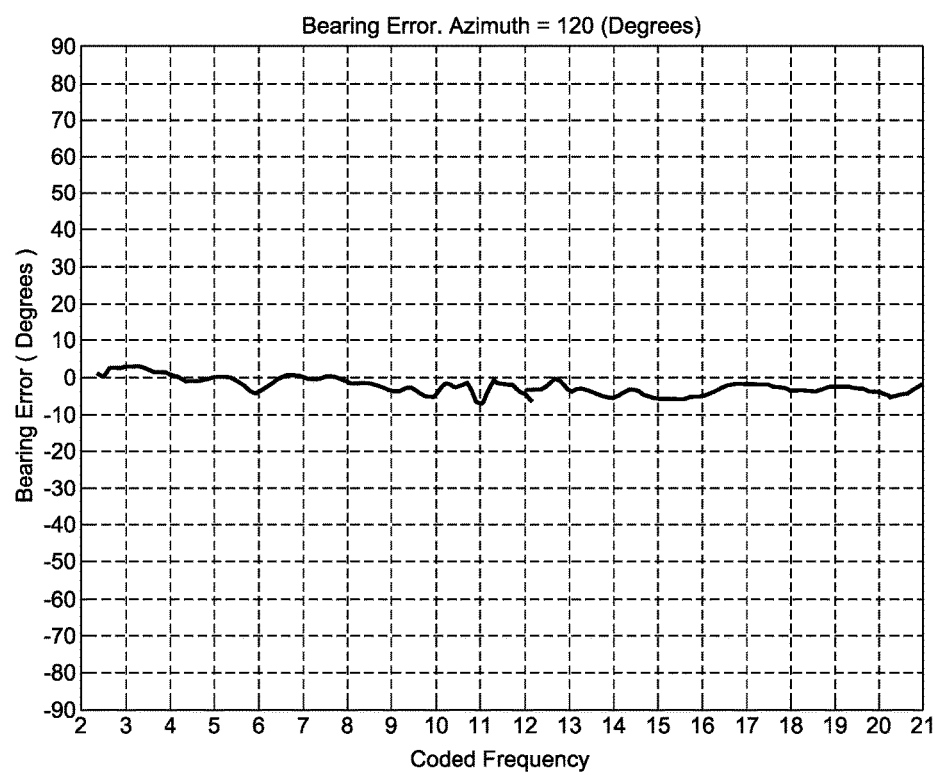
FIG. 17 depicts a performance difference between a hydrophone that does have uniform axial stress/voltage on each ring when assembled with the parameters of bearing error and coded frequency with an azimuth of one hundred and twenty degrees.
Figure 18:
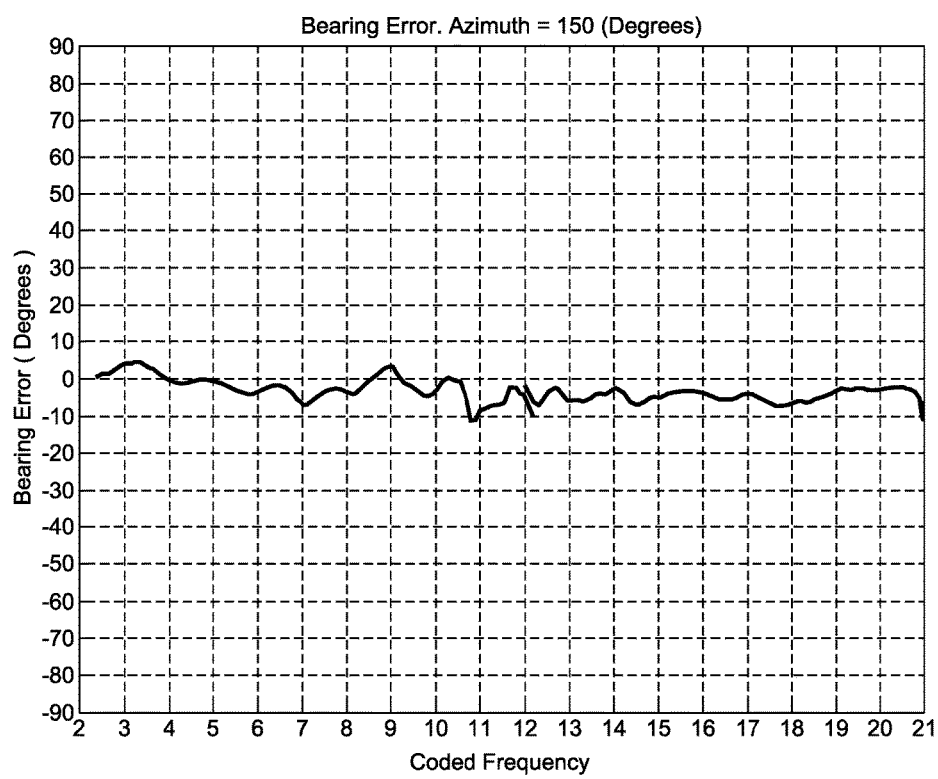
FIG. 18 depicts a performance difference between a hydrophone that does have uniform axial stress/voltage on each ring when assembled with the parameters of bearing error and coded frequency with an azimuth of one hundred and fifty degrees.
Figure 19:
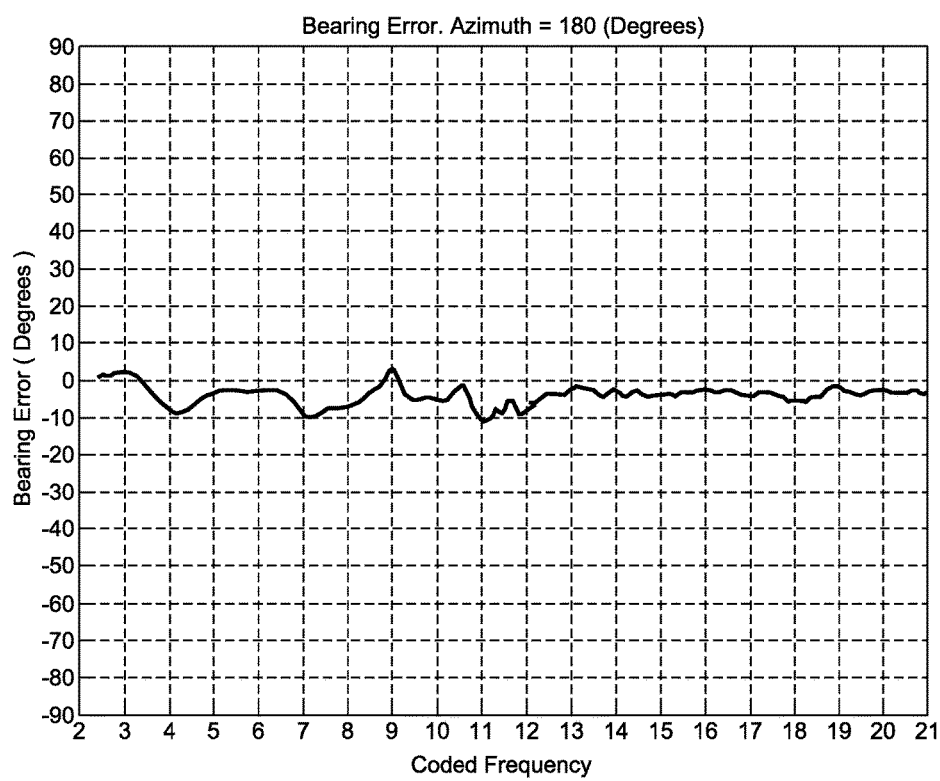
FIG. 19 depicts a performance difference between a hydrophone that does have uniform axial stress/voltage on each ring when assembled with the parameters of bearing error and coded frequency with an azimuth of one hundred and eighty degrees.
Figure 20:
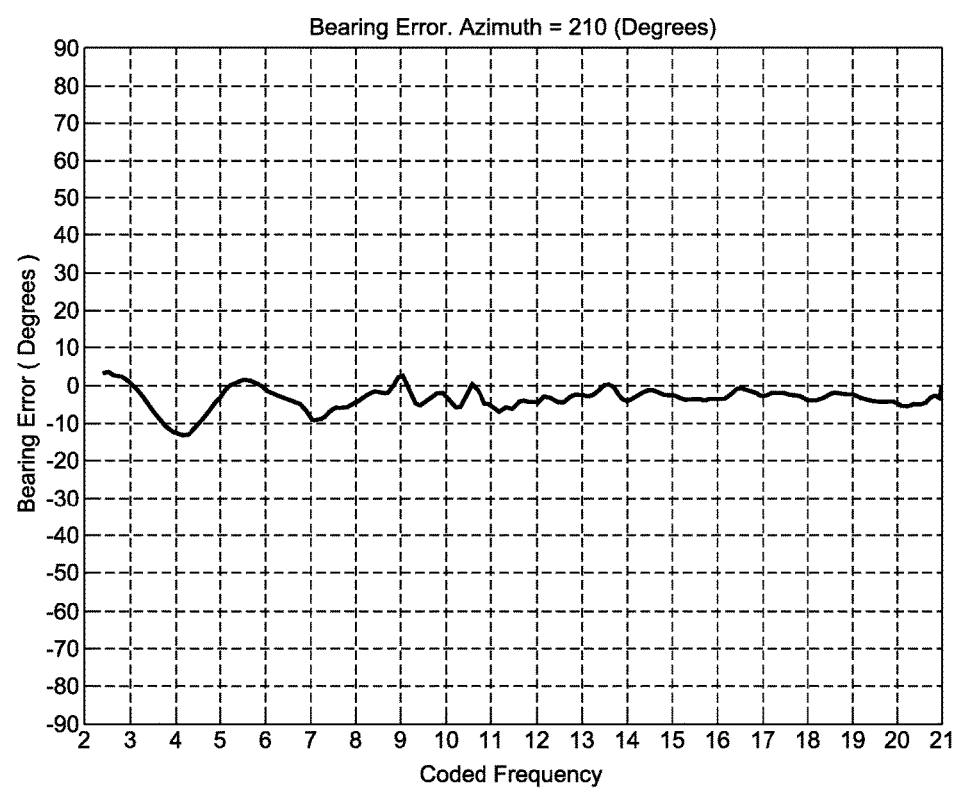
FIG. 20 depicts a performance difference between a hydrophone that does have uniform axial stress/voltage on each ring when assembled with the parameters of bearing error and coded frequency with an azimuth of two hundred and ten degrees.
Figure 21:
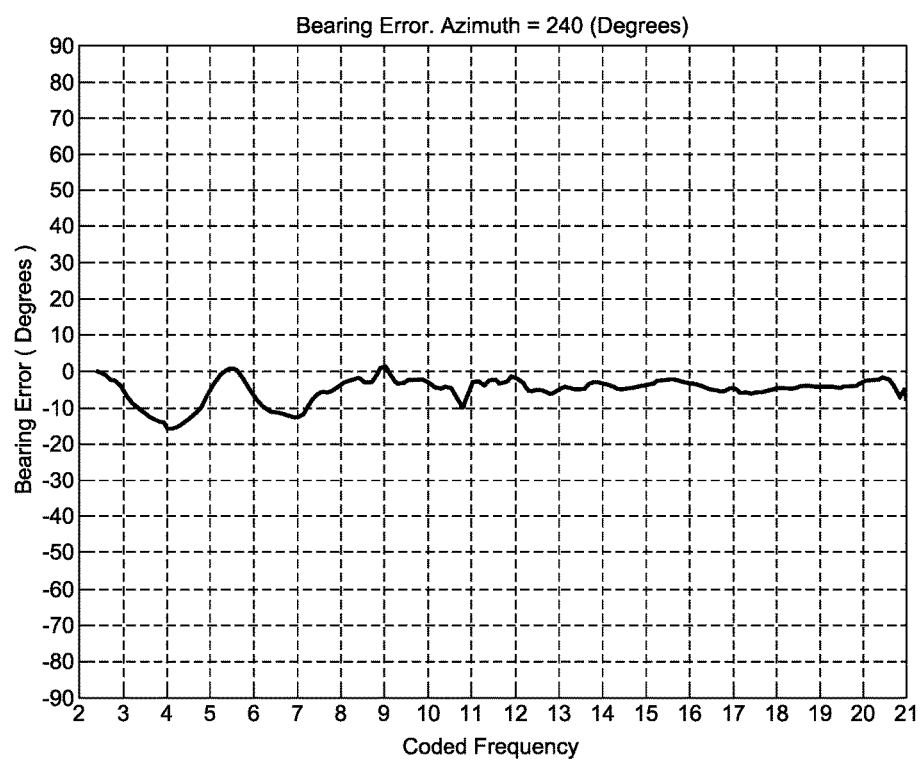
FIG. 21 depicts a performance difference between a hydrophone that does have uniform axial stress/voltage on each ring when assembled with the parameters of bearing error and coded frequency with an azimuth of two hundred and forty degrees.
Figure 22:
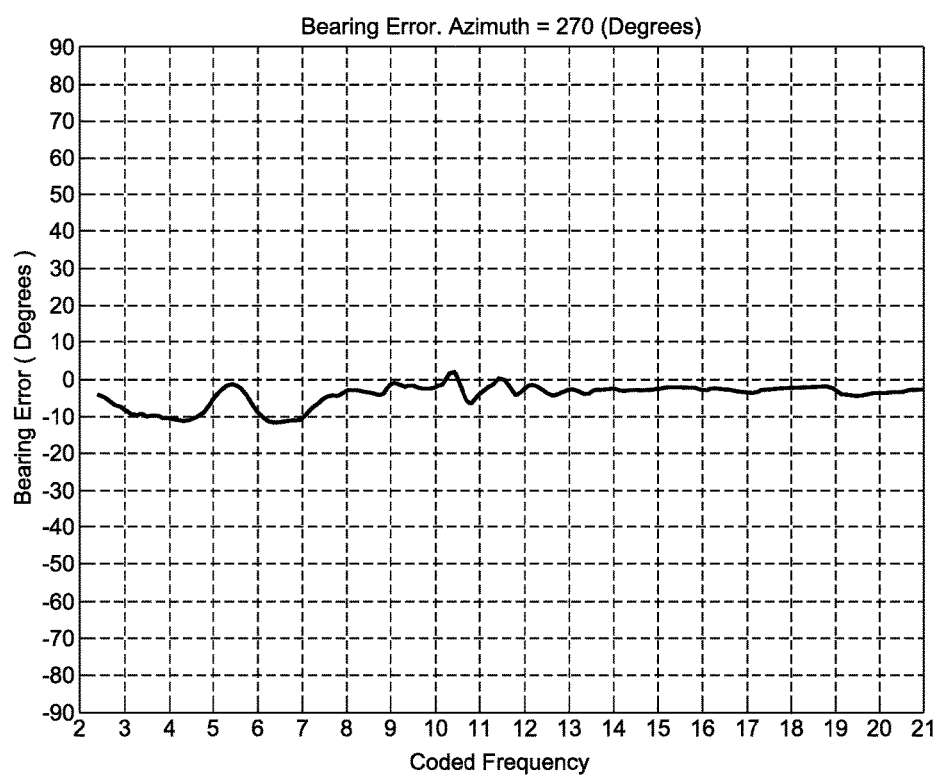
FIG. 22 depicts a performance difference between a hydrophone that does have uniform axial stress/voltage on each ring when assembled with the parameters of bearing error and coded frequency with an azimuth of two hundred and seventy degrees.
Figure 23:
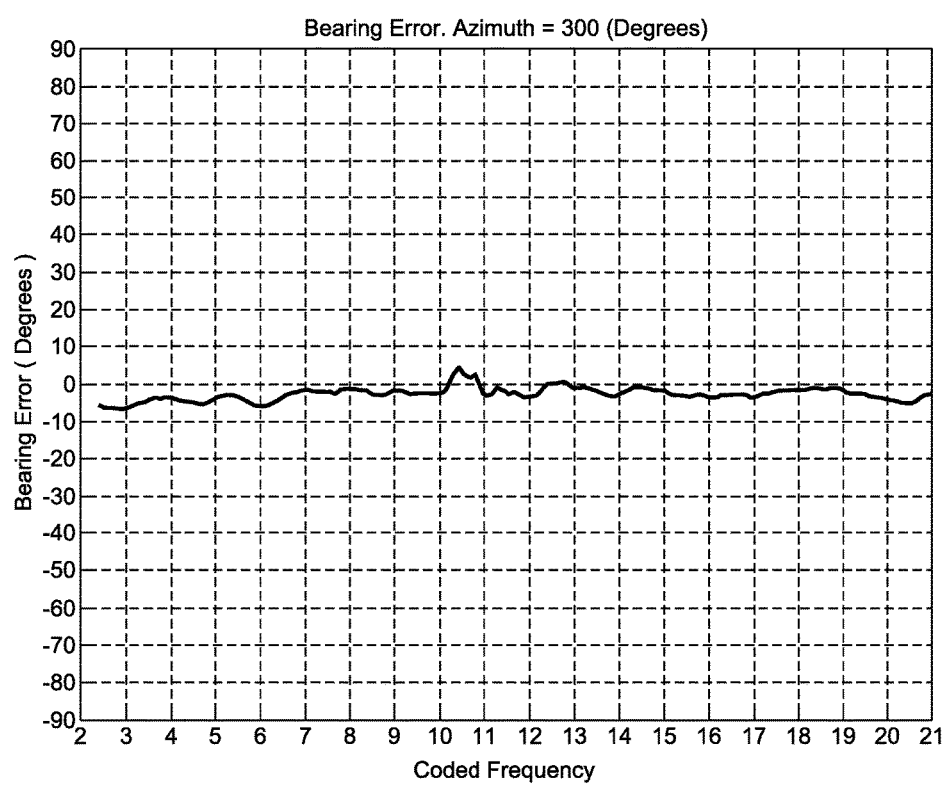
FIG. 23 depicts a performance difference between a hydrophone that does have uniform axial stress/voltage on each ring when assembled with the parameters of bearing error and coded frequency with an azimuth of three hundred degrees.
Figure 24:
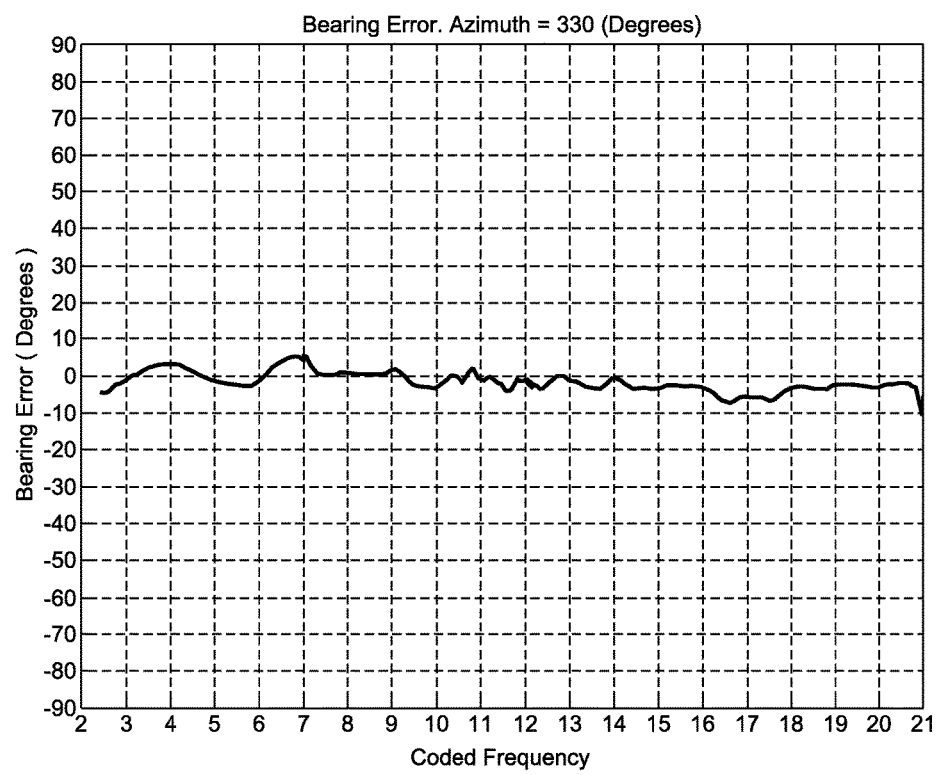
FIG. 24 depicts a performance difference between a hydrophone that does have uniform axial stress/voltage on each ring when assembled with the parameters of bearing error and coded frequency with an azimuth of three hundred and thirty degrees.
Figure 25:
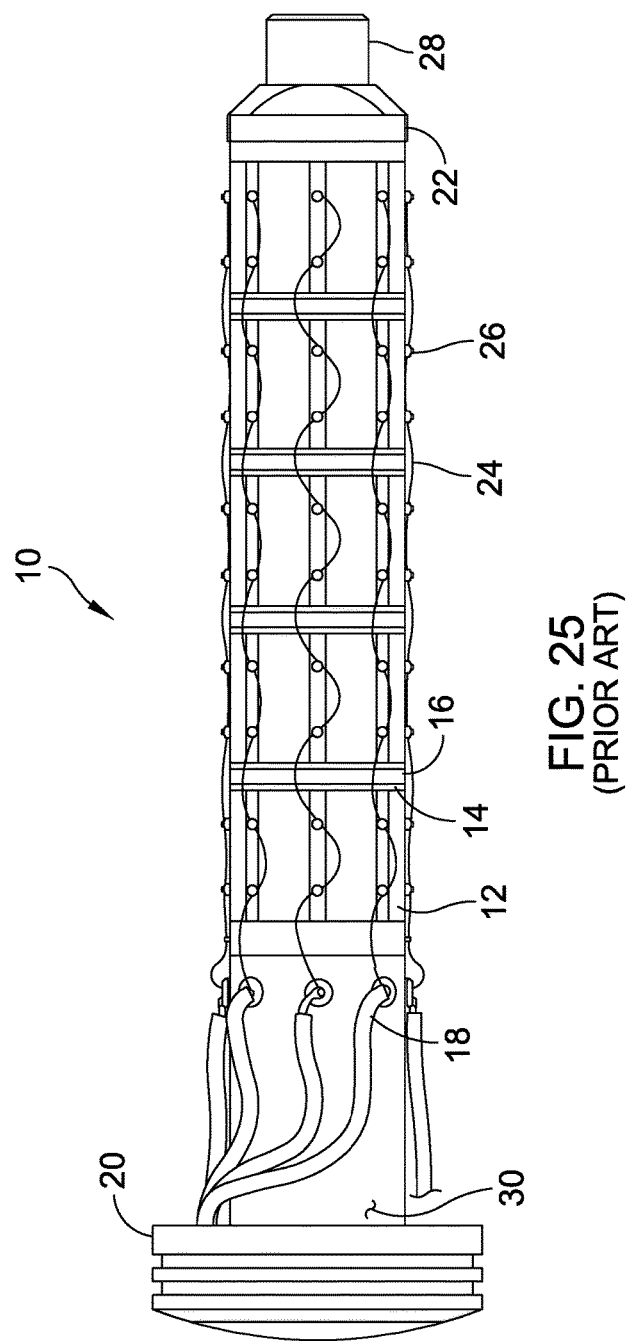
FIG. 25 depicts a prior art hydrophone.

The piezoelectric portion of the invention described and reflected in FIG. 27 is approximately seven inches in length, less than an inch in diameter and weighs less than three pounds. A prior art hydrophone, generally as shown in FIG. 25, that covers the same frequencies is twenty-four inches in length, six inches in diameter and weighs thirty-five pounds.

The foregoing description of the preferred embodiments of the invention has been presented for purposes of illustration and description only. It is not intended to be exhaustive or to limit the invention to the precise form disclosed; and obviously many modifications and variations are possible in light of the above teaching.

It will be understood that many additional changes in the details, materials, steps and arrangement of parts, which have been herein described and illustrated in order to explain the nature of the invention, may be made by those skilled in the art within the principle and scope of the invention as expressed in the appended claims.

What is claimed is:

1. A method of assembling a hydrophone, said method comprising the sequential steps of:

providing a plurality of tangentially poled ceramic rings, a plurality of Delrin washers, a plurality of LC-800 washers, a length of 26 AWG bus wire, a socket head screw, a stainless steel flange, an end cap, a length of 30 AWG bus wire, a shaft and a phenolic feed through assembly;

sliding a first of the plurality of LC-800 washers onto the shaft;

sliding a first of the ceramic rings of the plurality of tangentially poled ceramic rings onto the shaft adjacent to the first LC-800 washer;

sliding a second of the plurality of LC-800 washers adjacent to the first ceramic ring on a side of the first ceramic ring opposite to the side that the first ceramic ring is adjacent to the first LC-800 washer;

sliding a first of the plurality of Delrin washers adjacent to the second LC-800 washer on a side of the second LC-800 washer opposite to the side that the second LC-800 washer is adjacent to the first ceramic ring;

sliding a third of the plurality of LC-800 washers adjacent to the first Delrin washer on a side of the first Delrin washer opposite to the side that the first Delrin washer is adjacent to the second LC-800 washer;

sliding a second of the plurality of tangentially poled ceramic rings adjacent to the third LC-800 washer on a side of the third LC-800 washer opposite to the side that the third LC-800 washer is adjacent to the first Delrin washer;

sliding a fourth of the plurality of LC-800 washers adjacent to the second ceramic ring on a side of the second ceramic ring opposite to the side that the second ceramic ring is adjacent to the third LC-800 washer;

sliding a second of the plurality of Delrin washers adjacent to the fourth LC-800 washer on a side of the fourth LC-800 washer opposite to the side that the fourth LC-800 washer is adjacent to the second ceramic ring;

sliding a fifth of the plurality of LC-800 washers adjacent to the second Delrin washer on a side of the second Delrin washer opposite to the side that the second Delrin washer is adjacent to the fourth LC-800 washer;

sliding a third of the plurality of tangentially poled ceramic rings adjacent to the fifth LC-800 washer on a side of the fifth LC-800 washer opposite to the side that the fifth LC-800 washer is adjacent to the second Delrin washer;

sliding a sixth of the plurality of LC-800 washers adjacent to the third ceramic ring on a side of the third ceramic ring opposite to the side that the third ceramic ring is adjacent to the fifth LC-800 washer;

sliding a third of the plurality of Delrin washers adjacent to the sixth LC-800 washer on a side of the sixth LC-800 washer opposite to the side that the sixth LC-800 washer is adjacent to the third ceramic ring;

sliding a seventh of the plurality of LC-800 washers adjacent to the third Delrin washer on a side of the third Delrin washer opposite to the side that the third Delrin washer is adjacent to the sixth LC-800 washer;

sliding a fourth of the plurality of tangentially poled ceramic rings adjacent to the seventh LC-800 washer on a side of the seventh LC-800 washer opposite to the side that the seventh LC-800 washer is adjacent to the third Delrin washer;

sliding an eighth of the plurality of LC-800 washers adjacent to the fourth ceramic ring on a side of the fourth ceramic ring opposite to the side that the fourth ceramic ring is adjacent to the seventh LC-800 washer;

sliding a fourth of the plurality of Delrin washers adjacent to the eighth LC-800 washer on a side of the eighth LC-800 washer opposite to the side that the eighth LC-800 washer is adjacent to the fourth ceramic ring;

sliding a ninth of the plurality of LC-800 washers adjacent to the fourth Delrin washer on a side of the fourth Delrin washer opposite to the side that the fourth Delrin washer is adjacent to the eighth LC-800 washer;

sliding a fifth of the plurality of tangentially poled ceramic rings adjacent to the ninth LC-800 washer on a side of the ninth LC-800 washer opposite to the side that the ninth LC-800 washer is adjacent to the fourth Delrin washer;
sliding a tenth of the plurality of LC-800 washers adjacent to the fifth ceramic ring washer on a side of the fifth ceramic ring opposite to the side that the fifth ceramic ring is adjacent to the ninth LC-800 washer wherein the plurality of ceramic rings, LC-800 washers and Delrin washers is a formed composite stack;
sliding the end cap adjacent to the tenth LC-800 washer opposite to the side that the tenth LC-800 washer is adjacent to the fifth ceramic ring;
tightening the head cap screw at a first torque against the end cap opposite to the side that the end cap is adjacent to the tenth LC-800 washer;
electrically connecting the length of the 26 AWG bus wire and the length of 30 AWG bus wire to the hydrophone such that the hydrophone is operational;
measuring voltage of each of the ceramic rings subsequent to said tightening the head cap screw step such that the range of voltage between each of the ceramic rings is within 0.1 volts;
confirming uniform axial compression of the ceramic rings by said voltage measuring step; and
tightening the head cap screw against the end cap at a second torque such that a top edge of the composite stack exceeds the shaft by 0.030 to 0.060 inches.

2. The method in accordance with claim 1, wherein the voltage between the first and second ceramic rings is greater than 0.1 volts with said method further comprising steps of:
disconnecting the length of the 26 AWG bus wire and the length of 30 AWG bus wire from the hydrophone such that the hydrophone is inoperative;
removing the end cap and end cap screw from the shaft;
sliding the fourth, fifth, sixth, seventh, eighth, ninth and tenth LC-800 washers off the shaft;
sliding the second, third, fourth and fifth ceramic rings off the shaft;
sliding the second, third and fourth Delrin washers off the shaft;
sliding a second of the ceramic rings adjacent to the third LC-800 washer on a side of the third LC-800 washer opposite to the side that the third LC-800 washer is adjacent to the first Delrin washer;
sliding a fourth of the LC-800 washers adjacent to the second ceramic ring on a side of the second ceramic ring opposite to the side that the second ceramic ring is adjacent to the third LC-800 washer;
sliding a second of the Delrin washers adjacent to the fourth LC-800 washer on a side of the fourth LC-800 washer opposite to the side that the fourth LC-800 washer is adjacent to the second ceramic ring;
sliding a fifth of the LC-800 washers adjacent to the second Delrin washer on a side of the second Delrin washer opposite to the side that the second Delrin washer is adjacent to the fourth LC-800 washer;
sliding a third of the ceramic rings adjacent to the fifth LC-800 washer on a side of the fifth LC-800 washer opposite to the side that the fifth LC-800 washer is adjacent to the second Delrin washer;
sliding a sixth of the LC-800 washers adjacent to the third ceramic ring on a side of the third ceramic ring opposite to the side that the third ceramic ring is adjacent to the fifth LC-800 washer;
sliding a third of the Delrin washers adjacent to the sixth LC-800 washer on a side of the sixth LC-800 washer opposite to the side that the sixth LC-800 washer is adjacent to the third ceramic ring;
sliding a seventh of the LC-800 washers adjacent to the third Delrin washer on a side of the third Delrin washer opposite to the side that the third Delrin washer is adjacent to the sixth LC-800 washer;
sliding a fourth of the ceramic rings adjacent to the seventh LC-800 washer on a side of the seventh LC-800 washer opposite to the side that the seventh LC-800 washer is adjacent to the third Delrin washer;
sliding an eighth of the LC-800 washers adjacent to the fourth ceramic ring on a side of the fourth ceramic ring opposite to the side that the fourth ceramic ring is adjacent to the seventh LC-800 washer;
sliding a fourth of the Delrin washers adjacent to the eighth LC-800 washer on a side of the eighth LC-800 washer opposite to the side that the eighth LC-800 washer is adjacent to the fourth ceramic ring;
sliding a ninth of the LC-800 washers adjacent to the fourth Delrin washer on a side of the fourth Delrin washer opposite to the side that the fourth Delrin washer is adjacent to the eighth LC-800 washer;
sliding a fifth of the ceramic rings adjacent to the ninth LC-800 washer on a side of the ninth LC-800 washer opposite to the side that the ninth LC-800 washer is adjacent to the fourth Delrin washer;
sliding a tenth of the LC-800 washers adjacent to the fifth ceramic ring washer on a side of the fifth ceramic ring opposite to the side that the fifth ceramic ring is adjacent to the ninth LC-800 washer;
sliding the end cap adjacent to the tenth LC-800 washer opposite to the side that the tenth LC-800 washer is adjacent to the fifth ceramic ring;
tightening the head cap screw at a first torque against the end cap opposite to the side that the end cap is adjacent to the tenth LC-800 washer;
electrically connecting the length of the 26 AWG bus wire and the length of 30 AWG bus wire to the hydrophone such that the hydrophone is operational;
measuring voltage of each of the ceramic rings subsequent to said tightening the head cap screw step such that the range of voltage between each of the ceramic rings is within 0.1 volts;
confirming uniform axial compression of the ceramic rings by said voltage measuring step; and
tightening the head cap screw against the end cap at a second torque such that a top edge of the composite stack exceeds the shaft by 0.030 to 0.060 inches.

3. The method in accordance with claim 2, wherein the voltage between the second and third ceramic rings is greater than 0.1 volts with said method further comprising steps of:
disconnecting the length of the 26 AWG bus wire and the length of 30 AWG bus wire from the hydrophone such that the hydrophone is inoperative;
removing the end cap and end cap screw from the shaft;
sliding the sixth, seventh, eighth, ninth and tenth LC-800 washers off the shaft;
sliding the third, fourth and fifth ceramic rings off the shaft;
sliding the third and fourth Delrin washers off the shaft;
sliding a third of the ceramic rings adjacent to the fifth LC-800 washer on a side of the fifth LC-800 washer opposite to the side that the fifth LC-800 washer is adjacent to the second Delrin washer;

sliding a sixth of the LC-800 washers adjacent to the third ceramic ring on a side of the third ceramic ring opposite to the side that the third ceramic ring is adjacent to the fifth LC-800 washer;

sliding a third of the Delrin washers adjacent to the sixth LC-800 washer on a side of the sixth LC-800 washer opposite to the side that the sixth LC-800 washer is adjacent to the third ceramic ring;

sliding a seventh of the LC-800 washers adjacent to the third Delrin washer on a side of the third Delrin washer opposite to the side that the third Delrin washer is adjacent to the sixth LC-800 washer;

sliding a fourth of the ceramic rings adjacent to the seventh LC-800 washer on a side of the seventh LC-800 washer opposite to the side that the seventh LC-800 washer is adjacent to the third Delrin washer;

sliding an eighth of the LC-800 washers adjacent to the fourth ceramic ring on a side of the fourth ceramic ring opposite to the side that the fourth ceramic ring is adjacent to the seventh LC-800 washer;

sliding a fourth of the Delrin washers adjacent to the eighth LC-800 washer on a side of the eighth LC-800 washer opposite to the side that the eighth LC-800 washer is adjacent to the fourth ceramic ring;

sliding a ninth of the LC-800 washers adjacent to the fourth Delrin washer on a side of the fourth Delrin washer opposite to the side that the fourth Delrin washer is adjacent to the eighth LC-800 washer;

sliding a fifth of the ceramic rings adjacent to the ninth LC-800 washer on a side of the ninth LC-800 washer opposite to the side that the ninth LC-800 washer is adjacent to the fourth Delrin washer;

sliding a tenth of the LC-800 washers adjacent to the fifth ceramic ring washer on a side of the fifth ceramic ring opposite to the side that the fifth ceramic ring is adjacent to the ninth LC-800 washer;

sliding the end cap adjacent to the tenth LC-800 washer opposite to the side that the tenth LC-800 washer is adjacent to the fifth ceramic ring;

tightening the head cap screw at a first torque against the end cap opposite to the side that the end cap is adjacent to the tenth LC-800 washer;

electrically connecting the length of the 26 AWG bus wire and the length of 30 AWG bus wire to the hydrophone such that the hydrophone is operational;

measuring voltage of each of the ceramic rings subsequent to said tightening the head cap screw step such that the range of voltage between each of the ceramic rings is within 0.1 volts;

confirming uniform axial compression of the ceramic rings by said voltage measuring step; and tightening the head cap screw against the end cap at a second torque such that a top edge of the composite stack exceeds the shaft by 0.030 to 0.060 inches.

4. The method in accordance with claim 3, wherein the voltage between the third and fourth ceramic rings is greater than 0.1 volts with said method further comprising steps of:

disconnecting the length of the 26 AWG bus wire and the length of 30 AWG bus wire from the hydrophone such that the hydrophone is inoperative;

removing the end cap and end cap screw from the shaft;

sliding the eighth, ninth and tenth LC-800 washers off the shaft;

sliding the fourth and fifth ceramic rings off the shaft;

sliding the fourth Delrin washer off the shaft;

sliding a fourth of the ceramic rings adjacent to the seventh LC-800 washer on a side of the seventh LC-800 washer opposite to the side that the seventh LC-800 washer is adjacent to the third Delrin washer;

sliding an eighth of the LC-800 washers adjacent to the fourth ceramic ring on a side of the fourth ceramic ring opposite to the side that the fourth ceramic ring is adjacent to the seventh LC-800 washer;

sliding a fourth of the Delrin washers adjacent to the eighth LC-800 washer on a side of the eighth LC-800 washer opposite to the side that the eighth LC-800 washer is adjacent to the fourth ceramic ring;

sliding a ninth of the LC-800 washers adjacent to the fourth Delrin washer on a side of the fourth Delrin washer opposite to the side that the fourth Delrin washer is adjacent to the eighth LC-800 washer;

sliding a fifth of the ceramic rings adjacent to the ninth LC-800 washer on a side of the ninth LC-800 washer opposite to the side that the ninth LC-800 washer is adjacent to the fourth Delrin washer;

sliding a tenth of the LC-800 washers adjacent to the fifth ceramic ring washer on a side of the fifth ceramic ring opposite to the side that the fifth ceramic ring is adjacent to the ninth LC-800 washer;

sliding the end cap adjacent to the tenth LC-800 washer opposite to the side that the tenth LC-800 washer is adjacent to the fifth ceramic ring;

tightening the head cap screw at a first torque against the end cap opposite to the side that the end cap is adjacent to the tenth LC-800 washer;

electrically connecting the length of the 26 AWG bus wire and the length of 30 AWG bus wire to the hydrophone such that the hydrophone is operational;

measuring voltage of each of the ceramic rings subsequent to said tightening the head cap screw step such that the range of voltage between each of the ceramic rings is within 0.1 volts;

confirming uniform axial compression of the ceramic rings by said voltage measuring step; and tightening the head cap screw against the end cap at a second torque such that a top edge of the composite stack exceeds the shaft by 0.030 to 0.060 inches.

5. The method in accordance with claim 4, wherein the voltage between the fourth and fifth ceramic rings is greater than 0.1 volts with said method further comprising steps of:

disconnecting the length of the 26 AWG bus wire and the length of 30 AWG bus wire from the hydrophone such that the hydrophone is inoperative;

removing the end cap and end cap screw from the shaft;

sliding the tenth LC-800 washer off the shaft;

sliding the fifth ceramic ring off the shaft;

sliding a fifth of the ceramic rings adjacent to the ninth LC-800 washer on a side of the ninth LC-800 washer opposite to the side that the ninth LC-800 washer is adjacent to the fourth Delrin washer;

sliding a tenth of the LC-800 washers adjacent to the fifth ceramic ring washer on a side of the fifth ceramic ring opposite to the side that the fifth ceramic ring is adjacent to the ninth LC-800 washer;

sliding the end cap adjacent to the tenth LC-800 washer opposite to the side that the tenth LC-800 washer is adjacent to the fifth ceramic ring;

tightening the head cap screw at a first torque against the end cap opposite to the side that the end cap is adjacent to the tenth LC-800 washer;

electrically connecting the length of the 26 AWG bus wire and the length of 30 AWG bus wire to the hydrophone such that the hydrophone is operational;

measuring voltage of each of the ceramic rings subsequent to said tightening the head cap screw step such that the range of voltage between each of the ceramic rings is within 0.1 volts;

confirming uniform axial compression of the ceramic rings by said voltage measuring step; and tightening the head cap screw against the end cap at a second torque such that a top edge of the composite stack exceeds the shaft by 0.030 to 0.060 inches.

\* \* \* \* \*